C. M. FOSTER.
PIPE THREADING MACHINE.
APPLICATION FILED FEB. 28, 1907.
922,120.
Patented May 18, 1909.
2 SHEETS—SHEET 1.
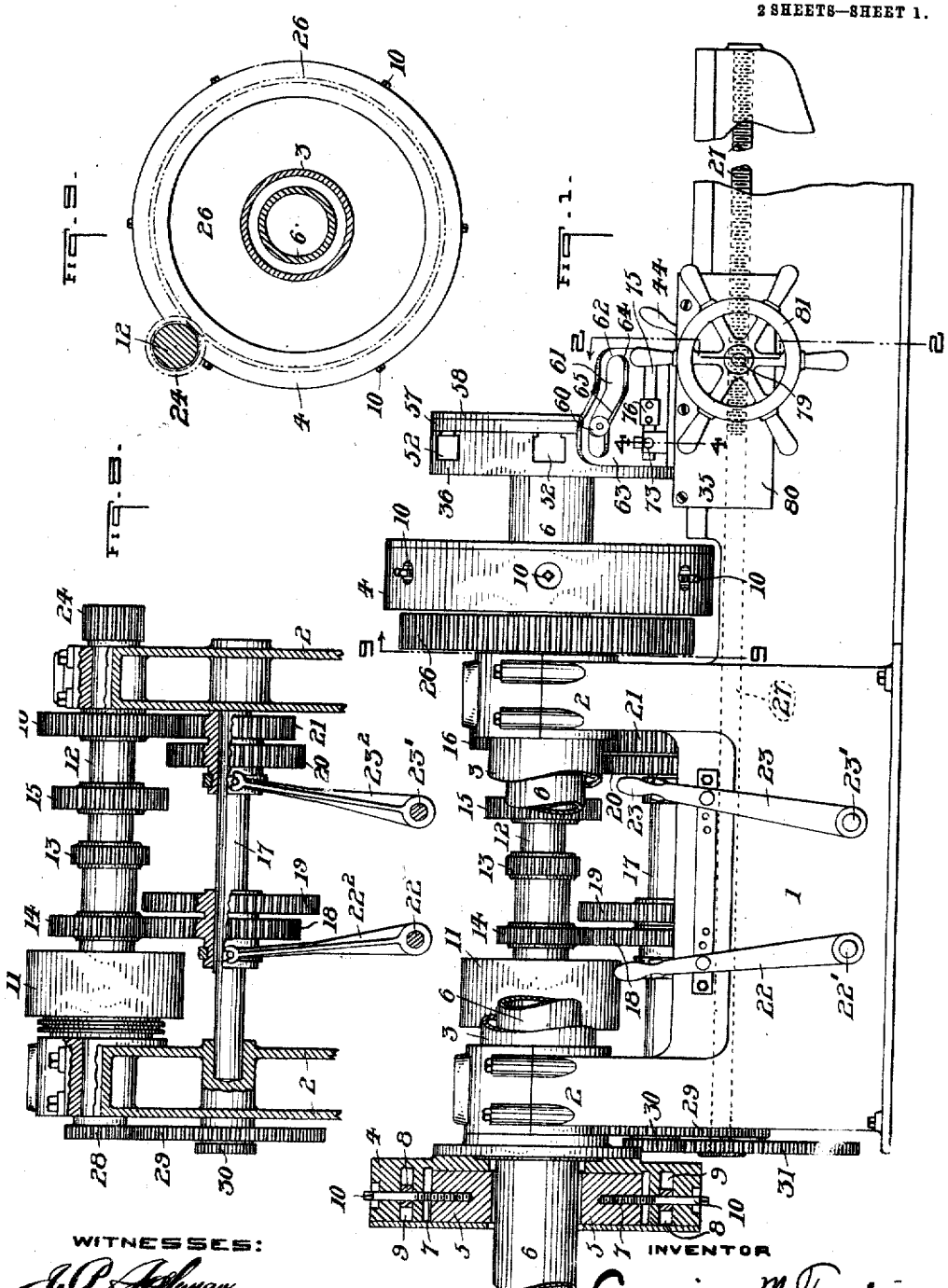

C. M. FOSTER.
PIPE THREADING MACHINE.
APPLICATION FILED FEB. 28, 1907.
922,120.
Patented May 18, 1909.
2 SHEETS—SHEET 2.
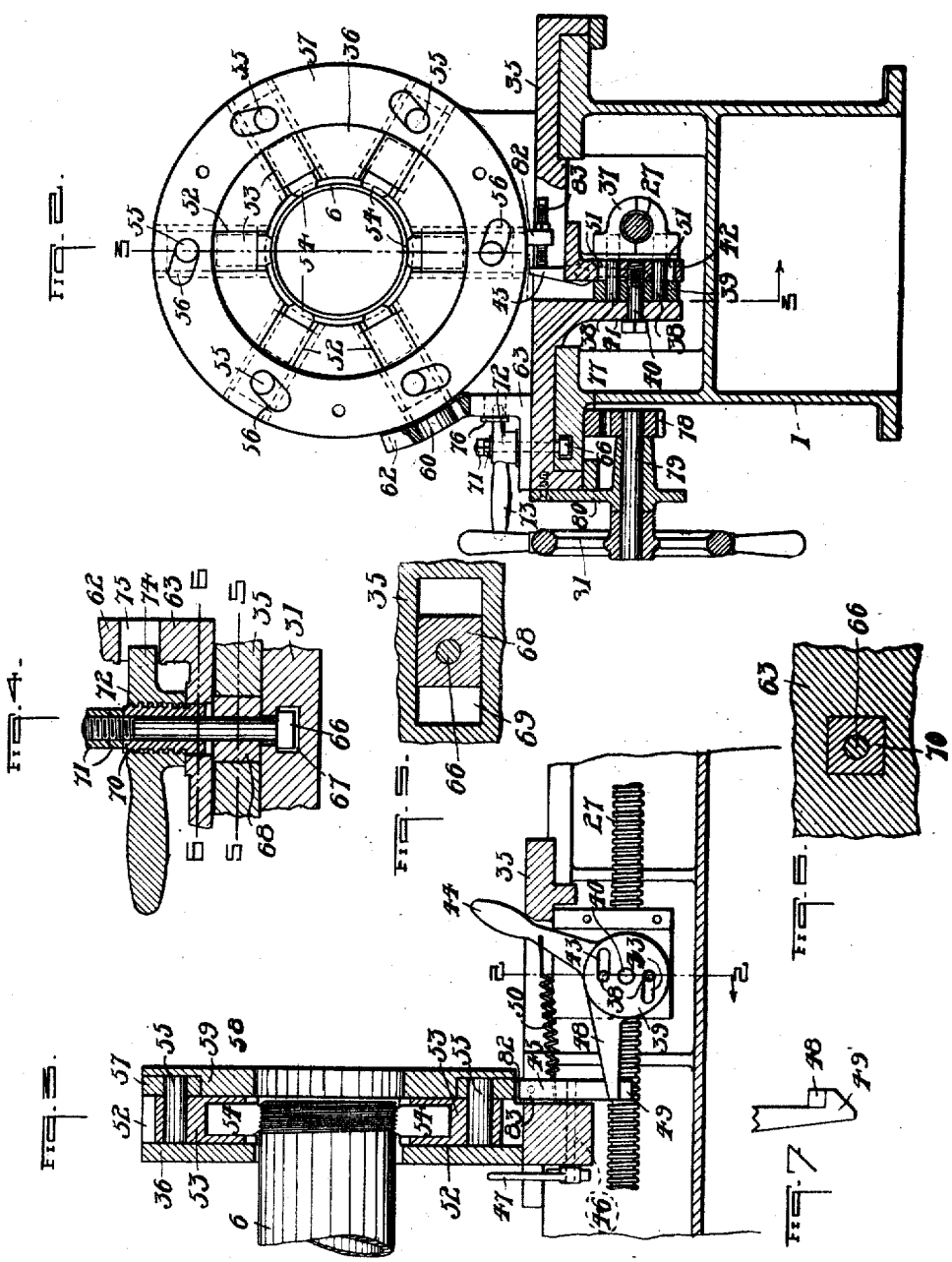
WITNESSES
INVENTOR

UNITED STATES PATENT OFFICE.

CASSIUS M. FOSTER, OF TOLEDO, OHIO, ASSIGNOR TO THE TOLEDO PIPE THREADING MACHINE COMPANY, OF TOLEDO, OHIO, A CORPORATION OF OHIO.

PIPE-THREADING MACHINE.

No. 922,120.     Specification of Letters Patent.     Patented May 18, 1909.

Application filed February 28, 1907. Serial No. 359,742.

*To all whom it may concern:*

Be it known that I, CASSIUS M. FOSTER, a citizen of the United States, residing at Toledo, in the county of Lucas and State of Ohio, have invented or discovered new and useful Improvements in Pipe-Threading Machines, of which the following is a specification.

My invention relates to pipe threading machines, particularly to that type thereof, in which the threading dies gradually move away from the axis of the pipe during the threading operation. This makes the pipe with the threads gradually deeper toward the ends, so that the latter will become tightly wedged in the slightly flaring female member of the pipe coupling, and so produce a gas and water tight joint.

The object of the present invention is to provide a machine of the character described which will accurately and automatically vary the radial position of the dies for the purposes stated, and which will preferably be power operated and provided with various safety devices and other accessories, as hereinafter described.

Referring to the drawings, Figure 1 is a side elevation of one form of my invention, portions being broken away and made in section in order to show the normally concealed parts; Fig. 2, a section on the line 2—2 of Figs. 1 and 3, a portion being broken away; Fig. 3, a section on the line 3—3 of Fig. 2; Fig. 4, a detail vertical section through a portion of my machine, on the line 4—4 of Fig. 1; Figs. 5 and 6, sections on the lines 5—5 and 6—6, respectively, of Fig. 4; Fig. 7, a detail of the catch for holding the sectional feed nut in coöperative relation to the feed screw; Fig. 8, a section showing the gearing employed; and Fig. 9, a section of Fig. 1 on the line 9—9, parts to the right of the head 4 being omitted.

On the drawings, 1 designates the bed or frame of the machine, and 2, 2, vertical housings spaced apart and containing bearings for the chuck-barrel 3, which has at each end beyond the housings a chuck-head 4. The chuck-heads may be made as desired, but I have shown, for the purpose of illustration merely, the left-hand head with the radially-acting dogs 5, movable into contact with and away from the pipe 6 by the actuation of the screws 7 which are secured to the collars 8 in the slots 9 in the head 4. The screws 7 may be turned by applying a wrench or handle to their squared ends 10, which extend out through the periphery of the head. The right-hand chuck head may be similarly or otherwise constructed.

11 is the driving-pulley which with the gears 13 and 14 is sleeved on the driving-shaft 12. The two spur-gears 15 and 16 are secured to the shaft 12. The gears 13, 14, 15, and 16 are of increasing diameter in the order named, the first two constituting one pair, and the remaining two, another pair. The shaft 17, parallel with the shaft 11, has slidingly mounted thereon two independently movable pairs of gears, one pair 18 and 19 coöperating with gears 14 and 13, respectively, and the pair 20 and 21 coöperating with the gears 15 and 16, respectively. The pairs of gears 18, 19, 20, and 21 are splined to the shaft 17 so as to rotate therewith. The pair 13 and 14 is spaced farther apart than the pair 18 and 19, so that, when the gears 14 and 18 are in mesh as shown, the gears 13 and 19 will be out of mesh, and so that, when the gears 16 and 21 are in mesh, as shown, the gears 15 and 20 are out of mesh, it being understood that the gears 18 and 19 are rigidly secured together; that the gears 20 and 21 are also secured together; and that the gears 13 and 14 are secured together rigidly with the pulley 11. The pair of gears 18 and 19 is slid on the shaft 17 by the handle 22, and the pair of gears 20 and 21, by the handle 23, the handles being on the rock shafts 22' and 23', connected to the collars carrying the said pairs of gears by the forked arms 22² and 23².

The right hand end of the shaft 12 has secured thereon the spur-gear 24 which meshes with the gear 26 on the right hand end of the barrel 3, so that when the shaft 12 is rotated the barrel 3 and the chuck-heads 4 are rotated. The shaft 12 has at its left hand end the pinion 28, which meshes with the spur-gear 29, rigid with the pinion 30. The latter meshes with the spur-gear 31, which is secured to the left hand end of the lead screw 27.

35 represents the carriage which supports the die-head 36 and has travel toward and away from the right-hand chuck by means of the sectional nut 37 carried by the carriage and coöperating with the screw 27. The nut is made in halves, each half carrying a pin 38. A disk 39 is centrally pivoted on the pivot or screw 40, secured in the two flanges 41 and 42 depending from the bottom of the carriage bed, the disk being between said flanges. The disk has at opposite sides of its center the parallel slots 43, extending in opposite directions so that, as the disk is turned to the left from the position shown in Fig. 3, the pins 38 will travel away from each other and disengage the nut sections from the screw 27. The disk 39 is actuated to close the nut sections by means of the handle 44. The disk is locked in the position shown in Fig. 3, which is the position in which the nut sections are in engagement with the screw 27, as shown in Fig. 2, by the catch or trigger 45, secured to the rock-shaft 46.

47 is a handle on the shaft 46, by which the trigger may be actuated.

The disk 39 has an arm 48 which, when the disk is as shown in Fig. 3, rests on the hook or shoulder 49 on the lower end of the trigger. The spring 50 secured to the handle 44 and a fixed support moves the disk toward the left when the trigger releases the arm 48.

The flange 42 has the slots 51 to permit the travel of the pins 38 when opening or closing the nut sections.

The die-head 36 has a number of radial ways 52, in each of which slides a die carrier 53, holding a threading die 54.

The die-holders carry forward projecting pins 55, which extend into the diagonal slots 56 in the ring or annular plate 57, loosely mounted in the die-head 36. The slots 56 are diagonal relative to the direction of travel of the die-carriers. The die-head has the cover plate 58, which fits over the plate 57 and has the hub 59 within the plate 57 to form a bearing for the latter. The ring carries a projecting roller 60 which travels in the cam-slot 61 in the cam-plate 62 on the upper edge of the bracket 63. The right-hand end of the cam-slot gradually rises toward the left for a short distance as shown at 64 and then the inclination suddenly increases as shown at 65 and then the slot extends to the left for a short distance substantially parallel with the pipe 6.

The foot of the bracket 63 is secured to the top of the bed 1 by means of the bolt 66 having its head in the undercut groove 67 therein. On the bed 1 I place the spacing block 68 set in the slot 69 in the carriage, the block being thicker than the base of the carriage as shown in Fig. 4. The exteriorly threaded sleeve 70 is slid on the bolt 66 above the block 68 and is held thereon by the nuts 71. The sleeve is prevented from rotation by having its lower square end in a square opening in the hole of the bracket, as shown in Fig. 6. The nut 72 works on the threads on the sleeve 70, bears on the foot of the bracket 63, as shown in Fig. 4, and is provided with the handle 73 and the lug 74 extending into the slot 75 in the bracket 63.

76 is a tripping block secured to the die carriage and adapted to engage with the lug 74 in case the feed of the carriage is not stopped soon enough, as will be explained.

The under side of the bed 1 is provided with the rack 77, meshing with the pinion 78 on the shaft 79 mounted in the side plate 80 on the carriage 35. The shaft 79 is rotated by the hand wheel 81, when the nut 37 is out of engagement with the screw 27, in order to back off the carriage and make adjustments thereof more quickly than the rotation of the screw would permit.

The disk 57 is provided with the lug 82 which carries the screw 83, arranged to contact, on certain conditions, with the upper end of the trigger 45 and release the arm 48 therefrom, as hereinafter described.

The operation is as follows: The carriage being moved to the right till the roller 60 is at the right-hand end of the cam-slot 61, the nut sections being closed on the screw 27 and locked by the trigger 45, and the pipe 6 being secured in the chucks 4 with one end thereof about to be engaged by the dies 54, power is then applied to the pulley 11 to set the machine in motion. The speeds of rotation of the chucks and the screw 27 have previously been set so as to cause the pipe to rotate and the die-head carriage to travel, in order to cut in the pipe the thread having the pitch desired. As the carriage moves to the left the roller 60 gradually rises on the incline 64 of the cam slot 61 and causes the plate 57 to rotate from the observer looking at Fig. 1, or to the right on Fig. 2. This rotation of the plate 57 will permit the pins 55 to move outwardly gradually, so that the thread will gradually become shallower as the threading operation proceeds. When the roller reaches the incline 65, the thread should be cut the desired distance from the end of the pipe. The roller 60 then rides up the said incline 65 quickly, causing the dies 54 to be withdrawn clear of the pipe. The handle 47 may then be swung to withdraw the trigger 45 from the arm 48, whereupon the spring 50 swings the cam disk 39 to the left on Fig. 3, which causes the disengagement of the sections of the nut 37 from the lead-screw 27. In case the handle 47 should not be operated as soon as the operation is completed the screw 83 will engage the upper end of the trigger and cause the latter to release the cam-plate 39, and the block 76 will engage the lug 74 and loosen the nut 72, thus permitting the bracket to move with the carriage in case the roller should engage the left-hand of the slot 61. These two safety devices may be used alone, or together; in the latter case one will act when, for any reason, the other is out of order. As soon as the nut sections have been opened the hand wheel 81 is rotated to back off the carriage preparatory to another threading operation.

I provide several brackets 63 having the cam-slot 61 constructed with different lengths and inclines so as to provide for different lengths and pitches of the thread. These brackets may be exchanged one for another very quickly, as is readily apparent.

The inclinations of the cam-slot 61 are inclined from the planes including the cutting ends of the dies and the axis of the die head.

While I have minutely described my invention, I do not desire to be limited to the precise elements or combinations shown, as many modifications may be made while retaining the principles disclosed.

I claim—

1. In a pipe threading machine, a traveling die-head, a screw for causing the die-head to travel, a sectional nut carried by said die-head, means for moving the nut into engagement with said screw, a trigger for locking said nut-moving means, a rotary trip carried by said head for tripping the trigger at the completion of the threading operation, and means for retracting the nut from the screw when the trigger has been tripped.

2. In a pipe threading machine, a traveling die-head, a screw for causing the die-head to travel, a sectional nut carried by said die-head, means for moving the nut into engagement with said screw, a trigger for locking said nut-moving means, a rotary trip carried by said head for tripping the trigger at the completion of the threading operation, manually operated means for tripping said trigger, and means for retracting the nut from the screw when the trigger has been tripped.

3. In a pipe threading machine, a bed-plate, a traveling die-head thereon, a cam-plate, means coöperable with the cam-plate for controlling the position of the dies relative to the axis of said die-head, means for securing the cam-plate to the bed-plate, and means controlled by the die-head for releasing the connection between the bed-plate and the cam-plate when the die-head reaches a predetermined position with respect to the cam-plate.

Signed at Toledo, Ohio this 23rd day of February 1907.

CASSIUS M. FOSTER.

Witnesses:
A. M. STEWART,
G. W. WELLS.